(12) United States Patent
Vasagar et al.

(10) Patent No.: US 8,074,995 B2
(45) Date of Patent: Dec. 13, 2011

(54) LOW AND REVERSE PRESSURE APPLICATION HYDRODYNAMIC PRESSURIZING SEALS

(75) Inventors: Thurai Manik Vasagar, Hatfield, PA (US); Alan D. McNickle, Telford, PA (US); Diane R. McNickle, legal representative, Telford, PA (US); Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 13/010,305

(22) Filed: Jan. 20, 2011

(65) Prior Publication Data

US 2011/0115164 A1   May 19, 2011

Related U.S. Application Data

(60) Division of application No. 12/035,740, filed on Feb. 22, 2008, which is a continuation-in-part of application No. 11/821,578, filed on Jun. 21, 2007, now abandoned.

(60) Provisional application No. 60/815,782, filed on Jun. 21, 2006.

(51) Int. Cl.
    *F16J 15/40* (2006.01)
    *F16J 15/447* (2006.01)

(52) U.S. Cl. ........................ 277/301; 277/416

(58) Field of Classification Search ............ 277/416, 277/422, 535–544, 399–400, 301, 305
See application file for complete search history.

(56) References Cited

U.S. PATENT DOCUMENTS

| | | | | |
|---|---|---|---|---|
| 3,575,424 A | * | 4/1971 | Taschenberg | 277/411 |
| 4,943,069 A | * | 7/1990 | Jinnouchi | 277/543 |
| 5,169,159 A | * | 12/1992 | Pope et al. | 277/422 |
| 5,509,664 A | * | 4/1996 | Borkiewicz | 277/543 |
| 6,145,843 A | * | 11/2000 | Hwang | 277/400 |
| 6,692,006 B2 | * | 2/2004 | Holder | 277/346 |

* cited by examiner

*Primary Examiner* — Vishal Patel
(74) *Attorney, Agent, or Firm* — Michael Crilly, Esq.

(57) ABSTRACT

The present invention relates to circumferential seal ring segments positioned around a rotating shaft so as to prevent fluids from leaking from a lubricant sump during both low and high pressure conditions. The circumferential seal is comprised of a plurality of adjoining annular ring segments facing the rotating shaft. Each sealing ring segment includes a dead end circumferential groove on a shaft-side face of each sealing ring such that, when the segments are joined, the circumferential dead end groove of each segment extends arcuately in the direction of shaft rotation. At least one additional groove is contained on the shaft-side face of each sealing ring segment. The additional groove(s) directs and creates pressurized air within the dead end circumferential groove, either directly or indirectly maintaining a seal between the ring segments and the shaft. A bleed hole may also be provided to create a seal between each sealing segment.

3 Claims, 13 Drawing Sheets

LOW AND REVERSE PRESSURE APPLICATION HYDRODYNAMIC PRESSURIZING SEALS

CROSS REFERENCE TO RELATED APPLICATIONS

This application is a divisional application of co-pending U.S. Non-Provisional application Ser. No. 12/035,740, filed Feb. 22, 2008, which is a continuation-in-part of U.S. Non-Provisional application Ser. No. 11/821,578, filed Jun. 21, 2007, which claims priority from U.S. Provisional Application No. 60/815,782, filed Jun. 21, 2006. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The present invention relates to an apparatus and method for sealing a liquid sump. More specifically, the present invention relates to seal ring segments designed to generate high gas pressures across the seal and around a rotating shaft so as to prevent liquids from leaking from a liquid side of the seal to a gas side of the seal during low and high pressure conditions.

2. Background

There are many applications wherein housings are provided with a plurality of interior sections having rotating parts passing therethrough, wherein one of the interior housing sections must be isolated from another by means of a seal system. In gas turbine applications, for example, it is critical that lubricant contained within a lubricant chamber of the housing be sealed from an adjacent gas side of the seal. This is especially true along a rotatable shaft which often passes from the lubricant side of the seal to the gas side. In an aircraft engine these sump seals are used to separate ambient areas of high pressure air, e.g. the gas side, from an oil wetted area at lower ambient pressures, e.g. the lubricant side. These seals, thereby, serve two major functions: (1) prevention of oil leakage from the lower pressure compartment, and (2) minimization of the flow rate of hot air from the high pressure area to the oil wetted compartment.

Leakage of liquids from the lubricant side into the gas side adversely affects performance of the equipment where the seal is used. In case of an aircraft engine, oil leakage across the seal into a hot air side may cause oil coking or an engine fire. More specifically, when an oil lubricant is used, mixing the oil with the gas could result in formation of oil coke, a byproduct of oil heated to an elevated temperature, which chemically alters the oil and is detrimental to the gas turbine. Oil coke can foul seal surfaces reducing the integrity of the seal and prevent proper bearing lubrication within the lubricant sump. Accordingly, it is important in similar applications, not just the aircraft engine, that the lubricant be isolated within a lubricant sump and that the seal around the rotating shaft not allow the lubricant to escape the sump.

Seals in such applications may comprise either circumferential seals or face-type seals; however, the circumferential shaft seals are the most widely used under the above conditions. Circumferential seal is a name describing a generic type of seating device used widely, inter alia, on aircraft engine applications. FIGS. 1A and 1B show a liquid side 2 and a gas side 3 of a standard circumferential seal assembly 1. FIGS. 2A and 2B show back face and bore views of the same standard circumferential seal ring segment. In each of these figures, the seals consist primarily of several carbon and/or graphite segments 1 arranged circumferentially around a shaft 5 to form a continuous, relatively stationary sealing ring. The segment ends contain overlapping tongue 10 and socket joints 15 to restrict leakage at the end gaps of each segment.

Most current circumferential seals utilize a variant of the circumferential seal illustrated in FIGS. 1 and 2 to address a need for sealing a low pressure liquid compartment from such a high pressure gas compartment. For example, U.S. Pat. No. 5,145,189 discloses a similar circumferential seal with a shallow groove which redirects pressurized air to a plurality of deeper vent grooves. U.S. Pat. No. 6,145,843 also discloses a similar circumferential seal with shallow lift pockets in fluid communication with a high pressure region by a plenum chamber. Both of these solutions rely completely on the high pressure differential between the lubricant side and the gas side to achieve each respective sealing function. To this end, in low gas pressure conditions, anywhere from 5 psi and below and including negative pressures, these known circumferential seals can weep, namely, leak liquids from the liquid side into the gas side. Liquid leaking, as noted above, increases the risk of oil coking and fouling the seal face. This increases the risk of engine fire and increases the risk of oil odor within a vehicle housing the engine.

Accordingly, a seal is desired which may function to prevent liquid or oil leaking from a liquid or oil side to a gas side of an application, such as a turbine engine, wherein the seal may prevent leaking under low pressure differentials between a lubricant side and a gas side, as well as, high pressure differentials. The present invention, as disclosed herein, addresses this need.

SUMMARY OF THE INVENTION

The present invention relates to an apparatus and method for sealing a liquid sump. More specifically, the present invention relates to circumferential seal ring segments designed to generate high gas pressures across the seal face and around a rotating shaft so as to prevent liquid from leaking from a lubricant side to a gas side of the seal during both low and high pressure conditions.

The present invention includes a circumferential seal within an annular seal assembly, which is adapted to be received by an annular sump housing. More specifically, the annular sump housing substantially surrounds a rotatable shaft forming a sump chamber wherein the shaft passes through the chamber and through at least one open end of the sump housing. A fluid seal assembly is adapted to be received by the open end of the sump housing through which the shaft passes, and is comprised of an annular seal housing with an annular flange at one end and a windback at an opposing end. The fluid seal assembly is coupled to the open end of the sump housing by the annular flange such that the fluid seal housing and windback are held within the open end on an interior side of the sump chamber and surrounds the shaft so as to form a seal cavity therebetween. In this preferred configuration, the interior side of the sump chamber is the lubricant side of the sump and the exterior side of the chamber is the gas side.

The seal cavity formed between the shaft and fluid seal housing is sized to receive the circumferential seal of the present invention, which is comprised of a plurality of segmented rings mechanically urged inwardly toward the shaft. The seal may also be biased against a seal cavity wall by a plurality of springs and support rings. By urging the seal against both the shaft and the seal cavity wall, the seal and, ultimately, the fluid seal assembly isolate the sump housing chamber such that lubricant may be prevented from passing through the open end of the housing sump, i.e. from the lubricant side to the gas side, when the shaft is not rotating.

The circumferential seal of the present invention is comprised of a plurality of adjoining annularly sealing ring segments facing the rotating shaft wherein each sealing ring segment includes a dead end circumferential groove adjoined with a bore dam and at least one additional groove machined within a shaft-side face of each sealing ring segment. Specifically, the circumferential dead end groove and bore dam are at a position on the shaft-side face closer to the liquid region than to the gas region wherein the bore dam is exposed to the liquid region and is spaced between the liquid region and the dead end groove. When the segments are positioned proximate the shaft surface, the circumferential dead end groove of each segment extends arcuately in the direction of shaft rotation.

At least one additional groove is contained on the shaft-side face of each sealing ring segment in fluid communication with the dead end groove. The additional groove(s) is designed to direct fluid flow into the dead end circumferential groove such that fluid directed into the dead end annular groove increases fluid pressure within the dead end circumferential groove, thereby, forming a seal between the seal segments and the shaft. These additional groove(s) may be comprised of one or more hydrodynamic inclined grooves, hydrodynamic pockets (with an inlet and an outlet), axial bore grooves, or similar embodiments of structures, as defined herein.

In one embodiment, the additional groove is one or more hydrodynamic inclined pumping grooves. These hydrodynamic inclined pumping grooves extend from the dead end groove at an oblique pitch angle relative to the longitudinal axis of the ring seal segment so as to be in concert with the direction of rotation of the rotating shaft. The hydrodynamic pumping groove(s) may be of a constant width, variable width, constant depth, or variable depth. In a non-limiting example, the width and/or depth of the hydrodynamic groove (s) may be greater at a groove mouth than at a position of communication with the dead end groove. In another embodiment, a segment comprising more than one hydrodynamic groove may provide a unique depth and/or width of each groove, relative to the other inclined grooves of each seal segment.

In operation, when the shaft rotates, the inclined grooves direct fluid, preferably air, generated by the rotation of the shaft along the inclined grooves and into the dead end groove. As the air passes along the inclined grooves, it begins to accumulate within the dead end circumferential groove, thus increasing the pressure therein. This pressure is redirected toward the shaft creating a lift force on the seal segments wherein the lift force expands the sealing segments away from the shaft creating a minute clearance between the shaft-face of the seal segments and the rotating shaft. The redirection of the pressurized air within the dead end groove toward the shaft also creates an air/pressure seal within this minute clearance wherein the force of the high-pressure gas is at a sufficient velocity to prevent lubricant stored within the chamber from passing through the clearance. This air pressure seal is juxtaposed to the bore dam of the shaft-face of the seal such that the bore dam acts in concert with the air/seal to prevent lubricant from escaping from the housing chamber during operation of the turbine engine. In other words, lubricant is prevented from escaping from the lubricant side to the gas side of the chamber. This configuration has the advantages of creating an air seal that does not interfere with the rotation of the shaft, while reducing the wear on the shaft-side face seal as a result of the rotation of the shaft.

Pressurized gas from the dead end circumferential groove may also be released into the tongue/socket joints by way of a gas bleed hole. By allowing pressurized air from the dead end groove to leak into the sockets, the pressurized air also acts as a seal within the socket/tongue joints of two adjacent seal segments and flows at a high velocity so as to prevent lubricant from the liquid side from passing through the joints of the seal segments. To this end, this prevents liquid weepage through the tongue/socket joints.

In a second embodiment, the additional groove(s) is comprised of a hydrodynamic shallow pocket wherein the hydrodynamic shallow pocket is in fluid communication with the dead end circumferential groove by way of an outlet and fluid flow enters the pocket by way of an inlet. The pocket, inlet and outlet may be of a constant depth, a variable depth, a constant width, or a variable width. In a non-limiting example, depth and/or width the pockets may be greater proximate to the inlet than at the outlet. In a further example, the inlet and outlets may be at an oblique angle, relative to the longitudinal axis of the ring segments, such that the groove is in concert with the direction of rotation of the shaft. In an even further embodiment, a dam, with an optional bleed slot, may be present between each pocket and its respective outlet groove. The dam functions to increase pressure build up such that air flow is forced over the dam, or through the bleed slot, thereby increasing the air pressure within the dead end groove. In a further embodiment, a bleed slot may also be present between the dead end groove and the socket such that a seat is created at the socket/tongue joint in accordance with the above.

In operation, when the shaft rotates, the shallow pockets direct air generated by the rotation of the shaft along the inlet through the shallow pocket and the outlet to, ultimately, the dead end circumferential groove. As air passes along the shallow pocket, it is pressurized and begins to accumulate within the dead end circumferential groove, thus generating high pressure therein. This high pressure within the dead end circumferential groove creates a lift force on the seal segments and forms a seal around the rotating shaft in accordance with the above.

In a third embodiment, the additional groove(s) is comprised of an axial bore groove in fluid communication with the dead end circumferential groove. The axial bore groove may be in direct fluid communication with the dead end circumferential groove, or alternatively, the axial bore groove may be in fluid communication with the dead end circumferential groove by way of at least one longitudinal bore groove and a pressure chamber. The longitudinal bore groove(s) extends from the axial groove and along the longitudinal axis of the ring seal segment to a pressure chamber wherein the pressure chamber is in direct fluid communication with the dead end circumferential groove. Each longitudinal bore groove(s) may contain one or more hydrodynamic grooves on its inner surface wherein the hydrodynamic groove(s) extends along the longitudinal bore groove at an oblique angle with respect to the longitudinal axis of the longitudinal bore groove. In one embodiment, the hydrodynamic groove(s) is angled such that it facilitates the direction of air from the axial groove into the pressure chamber. The pressure chamber and/or axial groove may further comprise a dam, optionally with a bleed slot, between the pressure chamber and the dead end circumferential groove. The dam functions to increase pressure build up such that air flow is forced over the dam, or through the bleed slot into the dead end groove, thereby, increasing the air pressure within the dead end groove. The pressure chamber may also include a radial bleed slot placing the pressure chamber, or axial groove, and the socket into fluid communication.

Alternatively, at least two longitudinal bore grooves may extend from the axial bore wherein the first longitudinal bore groove extends to a first pressure chamber and the second longitudinal bore groove extends to a second pressure chamber. The first pressure chamber is in fluid communication with the dead end circumferential groove in accordance with the above. The second pressure chamber is only in fluid communication with the socket, by way of the radial bleed valve.

In operation, when the shaft rotates, the axial bore groove (s) directs air generated by the rotation of the shaft into the dead end circumferential groove either directly or by way of one or more longitudinal bores grooves and pressure chambers. As air passes along the axial bore groove or the longitudinal bore grooves, it begins to accumulate within the dead end circumferential groove, thus generating high pressure therein. The high pressure within the dead end groove creates a seal in accordance with the above. Additionally, pressure may bleed into the socket by way of the bleed valve, thereby creating a seal in the tongue/socket joint.

BRIEF DESCRIPTION OF THE DRAWINGS

FIG. 10A illustrates a constant depth pocket; FIG. 10B illustrates a pocket with a taper having higher depth at the inlet end and lower depth at the outlet end; FIG. 10C illustrates a pocket having a very small dam between the end of the pocket and the outlet groove; FIG. 10D illustrates a pocket with a bleed slot to release generated high pressure directly into the outlet groove; FIG. 10E illustrates angular orientation of the inlet and outlet grooves for the pocket to improve gas flow into the shallow pocket and release generated high pressure gas from the pocket into the dead end annular groove of the circumferential seal segment.

DETAILED DESCRIPTION OF THE INVENTION

The present invention relates to an apparatus and method for sealing a liquid sump. More specifically, the present invention relates to circumferential seal ring segments designed to generate high gas pressures across the seal face and around a rotating shaft so as to prevent fluids from leaking from a lubricant sump during both low and high pressure conditions. The circumferential seal is part of a larger seal assembly that is adapted to fit within a sump housing, as described herein. The circumferential seal is comprised of a plurality of adjoining annularly sealing ring segments facing the rotating shaft wherein each sealing ring segment includes a dead end circumferential groove adjoined with a bore dam and at least one additional groove machined within a shaft-side face of each sealing ring segment. Specifically, the circumferential dead end groove and bore dam are at a position on the shaft-side face closer to the liquid region than to the gas region where the bore dam is exposed to the liquid region and is spaced between the liquid region and the dead end groove. When the segments are positioned proximate the shaft surface, the circumferential dead end groove of each segment extends arcuately in the direction of shaft rotation.

At least one additional groove is contained on the shaft-side face of each sealing ring segment wherein the additional groove(s) directs fluid flow into the dead end circumferential groove such that fluid directed into the dead end annular groove increases air pressure within the dead end circumferential groove. As discussed further herein, this pressurized air forms a seal between the seal segments and the shaft. The additional groove(s) may be comprised of one or more hydrodynamic inclined grooves, hydrodynamic pockets (with an inlet and an outlet), axial bore grooves, or the like, as defined herein.

Figure 1A:
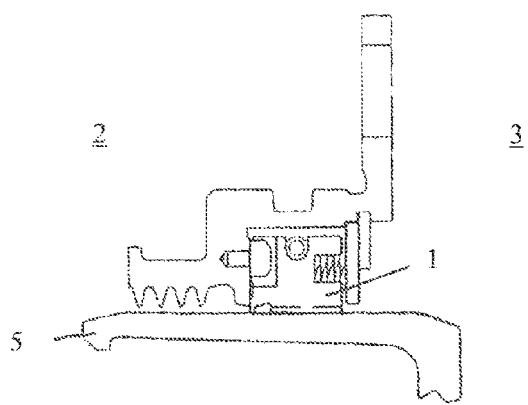
FIGS. 1A and 1B are a partially broken elevation taken in section, with section lines omitted for drawing clarity, of liquid and gas sides of a prior art circumferential seal assembly.
Figure 1B:
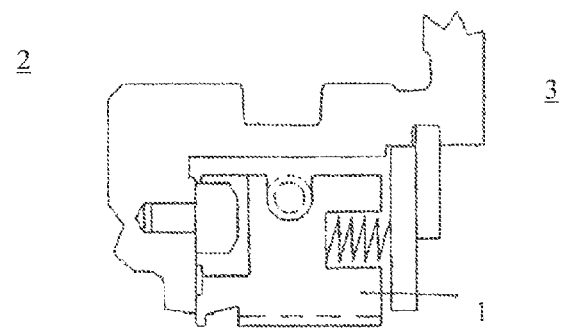
Figure 2A:
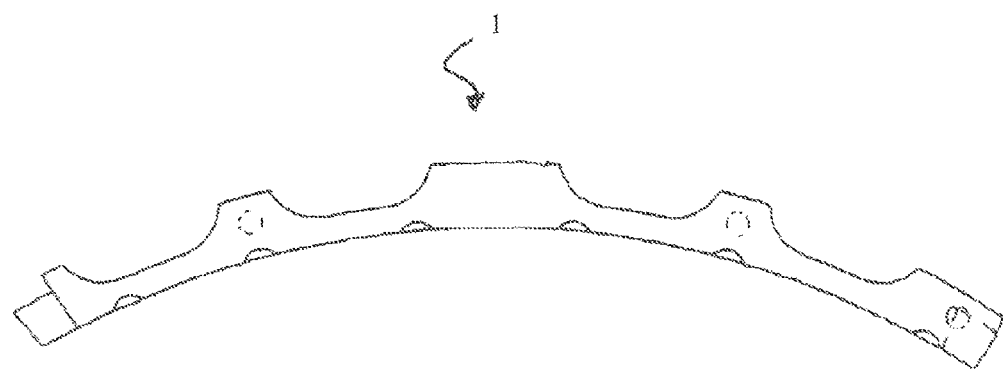
FIGS. 2A and 2B are an elevation of an axially facing surface and a view of a radially inwardly facing surface of a prior art circumferential seal ring segment forming a part of the assembly shown in FIG. 1.
Figure 2B:
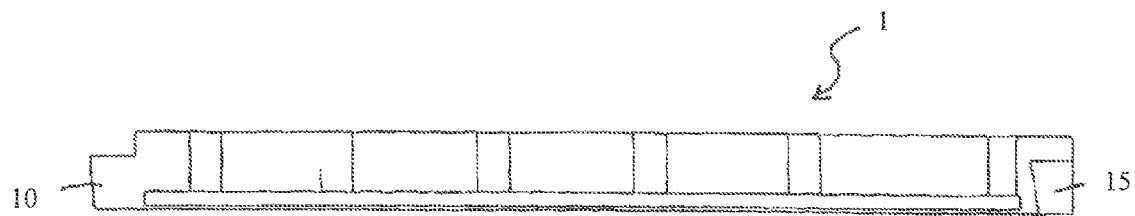
Figure 3A:
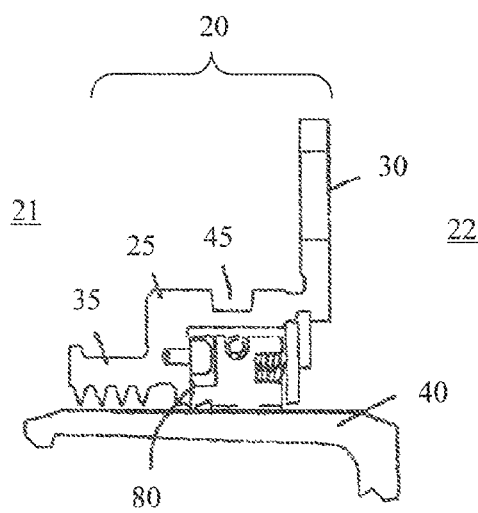
FIGS. 3A and 3B are a partially broken elevation taken in section, with section lines omitted for drawing clarity, of liquid and gas sides of a circumferential seal assembly of the present invention.

Referring to FIGS. 3A and B, a fluid seal assembly 20 is illustrated. The fluid seal assembly 20 is comprised of an annular fluid seal housing 25 flanked by a flange 30 at a first end and a windback 35 at an opposing second end. The annular fluid seal housing 25 is adapted to receive and sealingly engage a rotatable shaft 40, as discussed below. Extending from one end of the fluid seal housing 25 is an annular flange 30. The flange 30 extends radially from the fluid seal housing 25 and is adapted to substantially surround the shaft 40. The flange 30 is also adapted to be secured to a housing of the lubricant sump (not illustrated) such that the fluid seal assembly 20 isolates a lubricant chamber (represented generally by reference 21) from a gas side (represented generally by reference 22) of the assembly. Specifically, the flange 30 may be coupled to the sump by a plurality of bolts passing through a plurality of holes of the flange 30 and threadingly engaging a plurality of recesses of the sump housing (not illustrated). However, the invention is not limited to this embodiment and the flange 30 may be coupled to the sump by a screw, clasp, strap, or any other means understood in the art to secure the flange to a housing. Moreover, the invention is not limited to a plurality of recesses within the housing. Rather, the sump may also comprise a hook, screw, bolt or the like extending therefrom wherein the hook, screw, bolt, etc. is adapted to pass through the holes in the flange 30. An external means such as a nut, clasp, strap, retention ring, or the like may then be utilized to further secure the flange 30 to the sump. Regardless of the type of securing mechanism, the action of securing the flange 30 to the sump functions to secure the fluid seal assembly 20 to the sump housing.

The fluid seal housing 25 may also contain an O-ring (not illustrated), or other similar sealing mechanism, within a groove or recess 45 of the fluid seal housing 25. The O-ring is inserted into the groove 45 such that, when the fluid seal assembly 20 is secured to the sump housing (by way of the flange), the O-ring sealingly engages sump housing. This sealing engagement prevents leakage of the lubricant from the lubricant sump through the space between the fluid seal housing 25 and sump housing.

The annular fluid seal housing 25 is configured such that a bore passes therethrough wherein the bore opens to an annular seal cavity 50. The seal cavity 50 is adapted to receive the seal of the present invention and is sized to allow the shaft 40 to pass therethrough. More particularly, the seal cavity 50, along with the fluid seal housing 25, extends radially around the shaft 40 with a plurality of radial stepped seal-receiving grooves 55 an end of the seal cavity 50 proximal to the flange 30. The sealing cavity 50 and seal-receiving grooves 55 extend co-axially with the fluid seal housing 25 such that the seal cavity 50 and stepped seal-receiving grooves 55 substantially surround the shaft 40. The resulting diameter of the seal cavity 50 may be of any diameter understood in the art to support a circumferential seal and, ultimately, to seat the lubricant sump.

A plurality of circumferential seal segments 60 are adapted to fit within the seal cavity 50 such that the resulting seal is held in place by both a cavity wall and rings secured within the stepped seal-receiving grooves 55. More specifically, the seal segments 60 may fit within the seal cavity such that they substantially surround the shaft 40 and isolate the fluid within the sump. To this end, referring to FIG. 4, each seal segment may contain a tongue 65 at one end of the segment and a socket 70 at the opposing end such that the socket 70 of one seal segment is adapted to receive the tongue 65 of an adjacent segment such that the seal segments fit together around the circumference of the entire shaft 40. The seal segments 60 may be formed from carbon or carbon-graphite or any material understood in the art for a sealing surface within a chamber and along a runner or shaft. The seal segments, when joined, may form a ring with an outer diameter slightly smaller than the diameter of the seal cavity 50 and an inner diameter approximately the same diameter as the shaft 40. The number of seal segments 60 required to form the ring substantially around the shaft 5 varies with the size of the shaft. In other words, larger shafts may require a greater number of seal segments.

Referring again to FIG. 3, along the outer diameter of each seal is a recess 75 wherein, when the seal segments are joined, a continuous recess is formed about the seal segments 60. The recess 75 is adapted to receive a device that mechanically urges the seal segments against the shaft 40. In a non-limiting example, the device may be comprised of a circular coil spring 80 wherein the spring serves to urge the seal segments against the shaft 40, while still allowing the segments to expand or contract with the pressure differential created by the shaft rotation, as discussed below. As such, when the shaft 40 is not in operation, the action of the coil spring 80 on the shaft 40 creates a seal on the surface of the shaft that prevents lubricant from passing between the shaft and seal segments. The present invention, however, is not limited to a coil spring and may be comprised of any device understood in the art to bias or urge seal segments against a shaft 40.

Figure 3B:
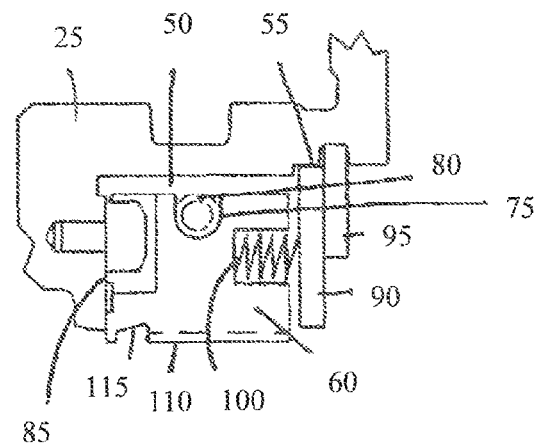

Isolating and sealing the lubricant sump is further enhanced by biasing the seal ring segments 60 against a seal cavity wall 85. Specifically, a seal support ring 90 may be positioned within the seal cavity 50 to bias the seal segments against the cavity wall 85, wherein the seal support ring 90 is fixed in position by one of the stepped seal-receiving grooves 55. The seal support ring 90 may be further fixed by a retaining ring 95, desirably a split retaining ring, which is received within another of the stepped seal-receiving grooves 55. As illustrated in FIGS. 3A and 3B, it is desirable that the seal support ring 90 and the retaining ring 95 are secured within adjacent stepped seal-receiving grooves 55 such that the retaining ring 95 biases the seal support ring 90 toward the seal ring segments 60 and the interior of the seal cavity 50.

In one embodiment, the seal support ring 90 mechanically urges the seal ring segments 60 against a seat cavity wall 85 through a plurality of springs. For example, the seal 60 may be urged toward the seal cavity wall 85 by a series of compression springs 100. Each compression spring 100 may extend from a series of pockets or a long continuous groove along the seal ring segments 60 to, ultimately, contact the seal support ring 90. The fixed position of the seal support ring 90 and the retaining ring 95 within the stepped seal-receiving grooves 55 allows these elements to urge the seal 60 against the seal cavity wall 85 by way of the action of the series of springs 100 retained therebetween. The present invention is not limited in the number of springs utilized; however, it is desirable that a sufficient number of springs be utilized to evenly compress the seal ring segments 60 against the seal cavity wall 85 without hindering the ultimate function of the sealing segments 60, i.e. to isolate the lubricant sump from the gas side.

The seal ring segments 60 are specifically machined to contain a plurality of grooves along a shaft-side face of the each segment such that these grooves generate high gas pressures across seal rings and the shaft. This increased pressure prevents fluid from leaking within spaces between the shaft 40 and the seal segments 60 during the operation of the shaft 40. In a first embodiment the grooves along the shaft-side face 110 of the seal segments 60 are a dead end circumferential groove 115 and at least one or a plurality hydrodynamic inclined pumping grooves 105. The circumferential dead end groove of each segment extends along the longitudinal axis of the shaft-face of the ring segment 60 such that, when the segments are linked, the dead end circumferential groove extends arcuately in the direction of shaft rotation. Preferably, a bore dam is spaced between the dead end circumferential groove and the lubricant side of the chamber. The width and depth of the grooves 115 and 105 are dependent upon multiple factors including, but not limited to, the engine application, shaft rotational speeds, desired seat life and the like. In one embodiment, the dead end circumferential groove 115 is machined at a position proximal to the bore dam 116 and the liquid side of the seal and is within the range of 0.040 to 0.060 inches in depth and within the range of 0.040 to 0.070 in width.

Figure 4A:
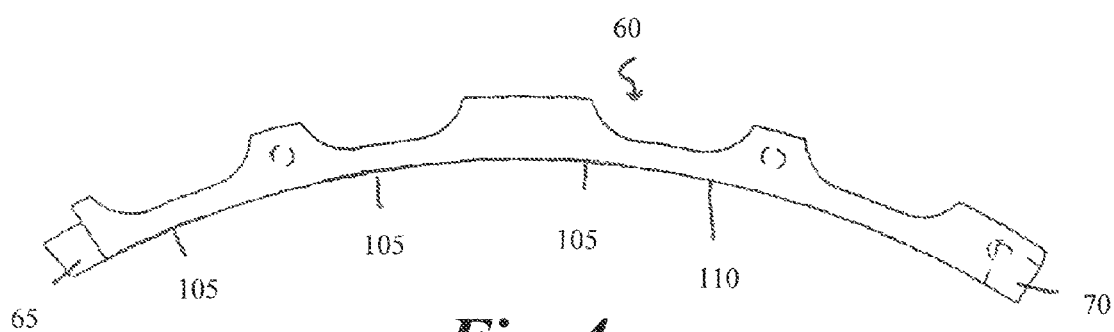
FIGS. 4A and 4B are an elevation of an axially facing surface and a view of a radially inwardly facing surface of a circumferential seal ring segment including inclined pumping grooves in accordance with the invention.
Figure 4B:
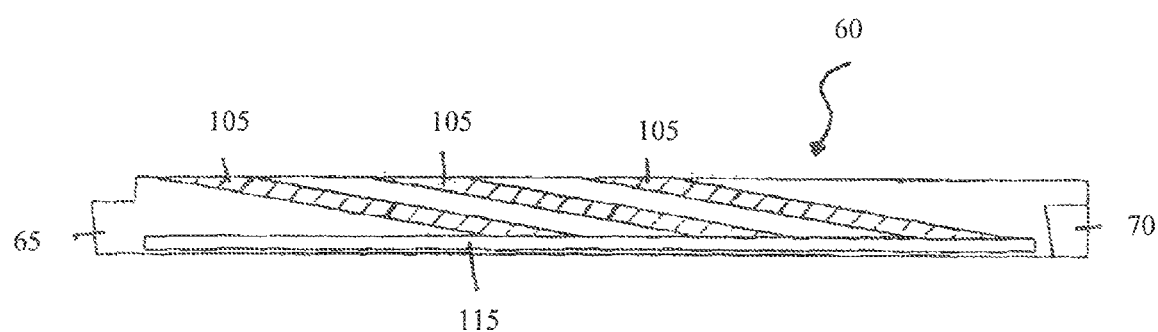

Referring to FIGS. 4A and 4B, the bore configuration of the inclined pumping groove seal ring segment is illustrated in accordance with the present invention. Specifically, a plurality of shallow inclined grooves is illustrated on the bore or shaft-side face of the seal ring segments 60. Each inclined groove extends across the face of the seal at an oblique angle relative to the longitudinal axis of the segment. Each inclined groove connects to and is in fluid communication with a dead end circumferential groove 115 running along the shaft-side face 110 of the seal segment 60.

Figure 8D:
FIGS. 8A-8E illustrates a number of variations of inclined pumping grooves in accordance with the invention, with each variation being shown on a single circumferential seal segment.
Figure 8A:
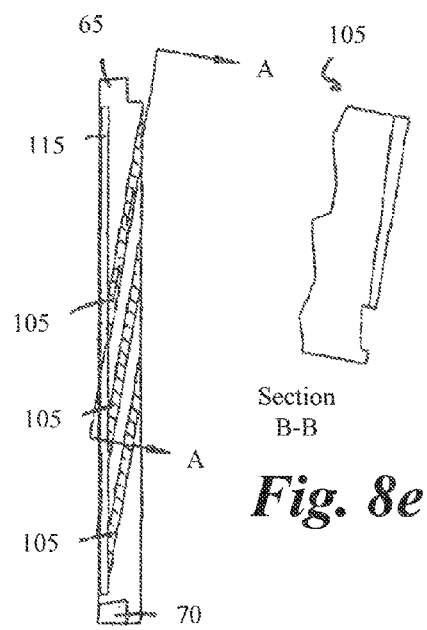
Figure 8E:
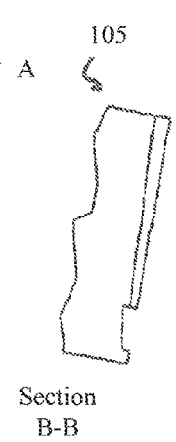
Figure 8B:
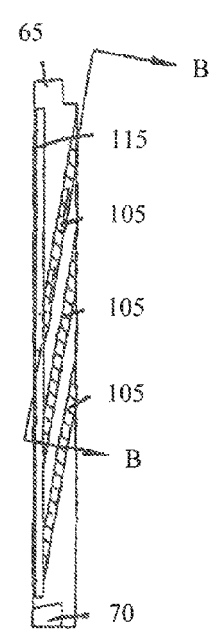
Figure 8C:
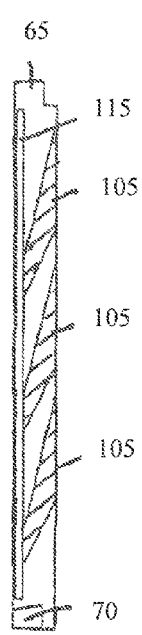

Referring to FIGS. 8A-C, various forms of inclined pumping grooves are illustrated in accordance with the present invention. Specifically, these inclined pumping grooves can have either sharp corners or cross sections with radii. Depending on the application, the number of grooves, groove depth, and groove width can be adjusted. As noted above, the width, depth, and positing of the inclined pumping grooves 105 are dependent upon multiple factors including, but not limited to, the engine application, shaft rotational speeds, desired seal life and the like. In one embodiment, the hydrodynamic inclined grooves may be within the range of 0.0005 to 0.035 inches in depth and 0.040 to 0.093 inches in width. In a further embodiment, it is desirable that the hydrodynamic inclined grooves be within a range of 0.020 to 0.025 inches in depth and 0.076 to 0.093 inches in width. To this end, each groove may be comprised of a constant width, constant depth, variable width, and/or a variable depth. In a non-limiting example, as illustrated in FIG. 8C, the inclined groove may have a depth and/or width that is greater at an end of the groove distal to the dead end groove 115 than at an end of the groove proximal and/or in communication with the dead end groove 115, thereby increasing the air pressure as the air flow approaches the dead end groove 115. In an additional non-limiting embodiment, if the seal segment is comprised of more than one hydrodynamic inclined groove, each groove may be of a unique width and/or depth relative to the other grooves, thereby creating variable pressures among the grooves that allow the seal to continually pressurize the air flow under varying circumstances. Each segment may also have grooves with multiple depths (multi-depth grooves), as illustrated in FIGS. 8D and 8E, instead of the same depths. The advantage of having segments with multi-depth grooves is that in the event the very shallow groove(s) wears to the point of being ineffective due to rubbing wear, the other grooves will pump the gas and generate high pressures until they wear down and even wear off one at a time.

The depth, width and pitch angle of the inclined grooves 105 and the depth and width of the dead end circumferential groove 115 may also be based on the particular application of the seal. Specifically, these measurements may be tailored based on factors such as the speed of rotation of the shaft 40, pressure differential between the sump and the gas side of the seal, temperature, or similar parameters to optimize the efficiency of air movement and the pressure created with in the dead end circumferential groove. In one embodiment, the dimensions of the dead end groove 115 and the inclined grooves 105 are such that the pressure generated within the dead end groove 115 is higher than the pressure on the gas side 22 of the seal.

Figure 5A:
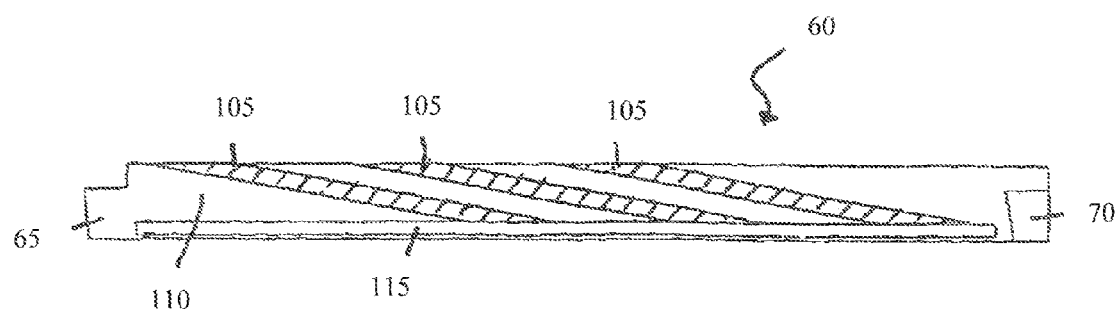
FIGS. 5A and 5B are an inboard view of one segment of the sealing ring, with an inclined pumping groove, with the direction of the pumping grooves in accordance with the direction of shaft rotation so as to facilitate pumping provided by the grooves.
Figure 5B:
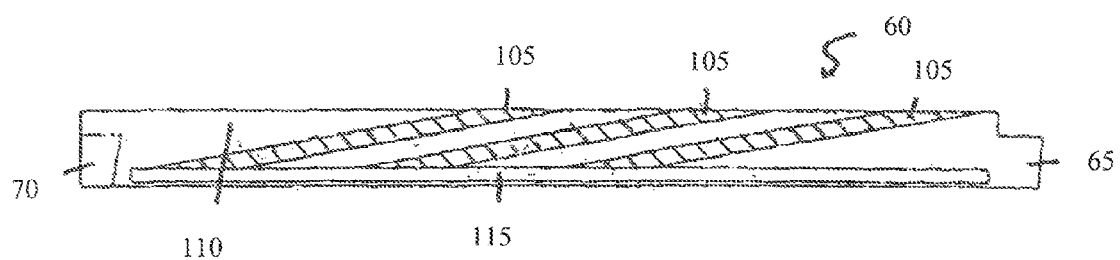

As indicated above, and illustrated in FIGS. 5A and 5B, the directional orientation and pitch angle of the inclined pumping grooves 105 is dependant upon the direction of rotation of the shaft. Proper orientation of the inclined pumping grooves 105, relative to the direction of shaft rotation, must be in concert with the direction of the sheer forces generated by the shaft rotation. The inclined pumping grooves 105 may, therefore, employ either a right hand pitch thread (as illustrated in FIG. 5B) or a left hand pitch thread (as illustrated in FIG. 5A). For a shaft rotating clockwise, a pitch angle of the thread would be a right hand thread (FIG. 5B), such that the grooves are in concert with the sheer forces or fluid flow generated by right-handed rotation. Conversely, for counterclockwise rotation of the shaft, the pitch angle of the thread would be the opposite to achieve the same result. The orientation of the tongue 65 and the socket 70 are also dependant upon the rotation of the shaft. For example, when orienting the inclined pumping groove direction in a left hand thread, the locations of the tongue and sockets of the segments also reversed, as compared to a right hand thread.

The angle of the inclined pumping grooves 105, relative to the longitudinal axis of the seal segment, 60, is dependent upon a myriad of factors including, but not limited to, the number of seal segments 60 required to substantially surround the shaft 5, the length of each seal segment 60, the number of inclined grooves in the seal segment, the length of each inclined groove, the engine application and shaft speeds, and the like. Specifically, the inclined pumping grooves 105 may be between 3 degrees and 45 degrees, relative to the longitudinal axis of the seal segment 60. For example, in one non-limiting embodiment a plurality of test seals forming a 8.700 inch diameter contains one inclined pumping groove 105 with an angle of 4.5 degrees, relative to longitudinal axis of the seal segments. In another non-limiting embodiment a plurality of test seals forming a 8.700 inch diameter contains three inclined pumping grooves 105 each at an angle of 10.0 degrees, relative to the longitudinal axis of the seal segments. Accordingly, the pitch angle is not static across all embodiments of the seal segments and may be changed based upon the above parameters.

Figure 6:
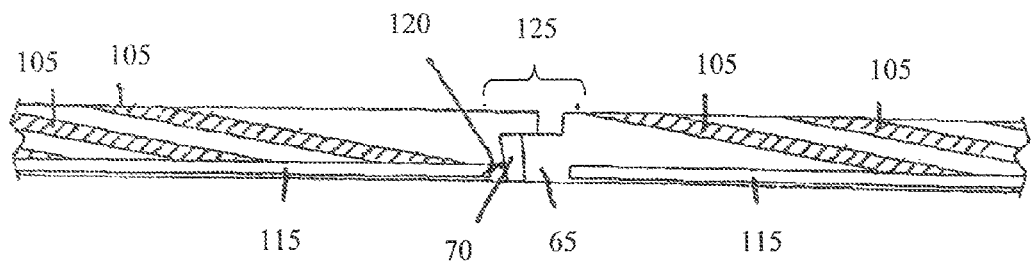
FIG. 6 illustrates two adjacent circumferential seal segments having inclined pumping grooves in accordance with the invention with a high pressure gas release hole being provided from the dead end arcuate groove of one of the segments through a socket face into the joint between the adjacent segments.
Figure 7:
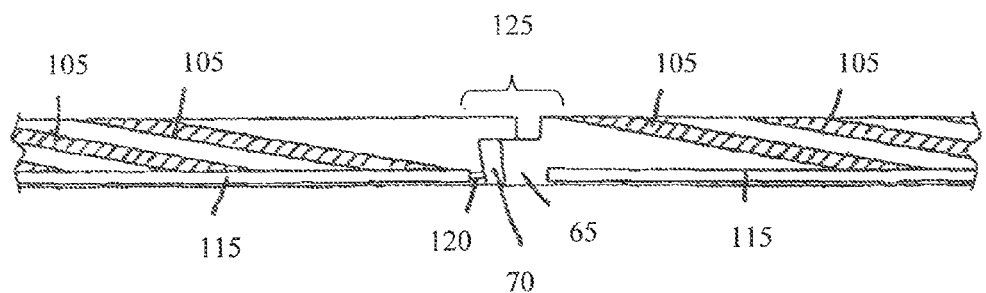
FIG. 7 is similar to FIG. 6 but illustrates another embodiment of the gas release slot, in place of the gas release hole, whereby high pressure gas may be released from the circumferential groove through the socket face into tongue and groove the joint between two adjacent circumferential seal segments having inclined pumping grooves.

In addition to a dead end circumferential groove and at least one inclined groove, the present embodiment may also contain a bleed hole 120. Referring to FIGS. 6 and 7, a high-pressure gas bleed hole 120 is illustrated as extending between the socket 70 and the dead end circumferential groove 115. Specifically, the gas bleed hole 120 extends from the dead end circumferential groove 115 to a point within a joint segment 125 where a tongue 65 of one seal segment 60 meets the socket 70 of a second seal segment 60. To this end, the bleed hole 120 places the socket 70 into fluid communication with the dead end circumferential groove 115.

In operation, when the shaft is not rotating, the coil spring 80 urges the seal segments toward the stationary shaft 40 and creates a seal between the shaft and housing 20. As the shaft begins to rotate, the inclined grooves 105 direct air generated by the rotation of the shaft 40 into the dead end groove 115. Air begins to accumulate within the inclined grooves and the dead end circumferential groove 115, thus generating high pressure therein. This high pressure may be higher than the pressure exerted on the seal segments 60 from a gas side 22 of the seal. In either case, the pressure within the dead end groove 115 is redirected toward the shaft creating a lift force on the seal segments wherein the lift force expands the sealing segments away from the shaft creating a minute clearance between the shaft-face of the seal segments and the rotating shaft. The redirection of the pressurized air within the dead end groove toward the shaft also creates an air/pressure seal within this minute clearance wherein the force of the high-pressure gas is at a sufficient velocity to prevent lubricant stored within the chamber from passing through the clearance. This air pressure seal is juxtaposed to the bore dam of the shaft-face of the seal such that the bore dam acts in concert with the air/seal to prevent lubricant from escaping from the housing chamber during operation of the turbine engine. In other words, lubricant is prevented from escaping from the lubricant side to the gas side of the chamber. This configuration has the advantages of creating an air seal that does not interfere with the rotation of the shaft, while reducing the wear on the shaft-side face seal as a result of the rotation of the shaft.

Additionally, pressurized gas from the dead end circumferential groove 115 may be released into the joints 125 by way of the gas bleed hole 120. By providing a bleed hole 120 connecting the dead end circumferential groove 115 and the socket 70 gas pressure built up within the dead end circumferential groove continues to escape into the joints even at low or reverse pressure conditions. This pressurized air acts as a seal within the socket/tongue joints of two adjacent seal segments and prevents liquid webpage therethrough.

The above embodiment of the present invention is advantageous because the inclined grooves greatly reduce leakage of liquids into the region on the gas side of the seal. Specifically, the redirection of air into the dead end groove 115, across the seal face, and seal segment joints 125 function to increase pressure within these grooves and joints. Because the dead end groove 115 is on the shaft-side face 110 of the seal, the pressure within the dead end groove 115 creates an air/pressure seal around the rotating shaft and lifts the seal segments off of the shaft such that the segments do not interfere with the rotation of the shaft. Accordingly, the seal between the lubricant side and gas side is maintained regardless of the pressure differential between the gas side and liquid side of the seal. The seal is able to function during both high and low air side to oil side pressure differential, as well as when negative pressure exists on the air side.

The present invention is also advantageous, as compared to a bore-rubbing circumferential seals, because the hydrodynamic seals according to the invention, when running on a film of gas, generate less heat due to friction. Less heat generation means less cooling oil is needed. As the seal runs on a thin film of gas, there is no rubbing between the seal bore and the runner or the shaft because there is essentially no contact. Hence, there is no significant seal bore wear. This provides extended seal wear life compared to a standard circumferential seal contacting the runner.

Finally, the present invention is advantageous because is allows variability with the width of the bore dam 116. Specifically, in prior seals a smaller bore dam was more efficiency for the reduction of bore loading and heat generation during rotation of the shaft. However, a smaller bore dam prevents the use of a more robust type of seal. In the present invention, the additional grooves, e.g. hydrodynamic grooves, provide for reduced bore loading. Accordingly, the size of the bore dam 116 may be varied with the present invention so as to form a more robust seal face.

Figure 9A:
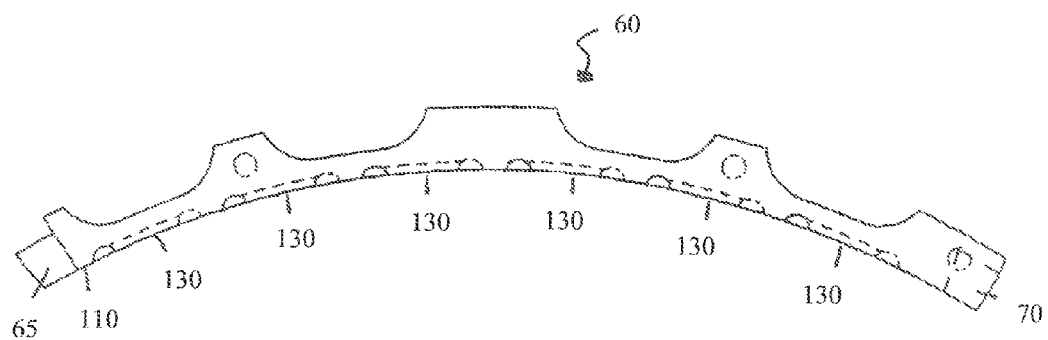
FIGS. 9A and 9B illustrates a shallow pocket hydrodynamic seal ring segment showing at the top of the figure a view of the segment taken in the axial direction and at the lower portion of the figure a view of the segment taken looking at a radially outwardly direction, showing the pockets located in the radially inwardly facing surface of the seal segment.
Figure 9B:
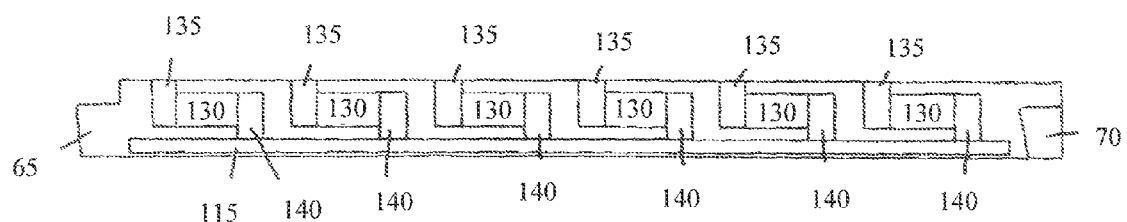

In a second embodiment of the present invention, referring to FIGS. 9A and B, the additional grooves along the shaft-side face 110 of the seal 60 are formed by at least one hydrodynamic shallow pocket 129, comprised of a pocket 130, inlet 135 and outlet 140, and a dead end circumferential groove 115. Specifically, the pockets 130 may be substantially square shaped, as illustrated. However, the pocket is not limited to this configuration. Rather, the pocket 130 may be rectangular, circular, oval, or any other aerodynamic and/or hydrodynamic configuration understood in the art. Extending from one end of each pocket 130 which is distal to the dead end circumferential groove is an inlet 135 wherein the inlet 135 extends from the pocket 130 such that it is adapted to receive fluid flow from the rotatable shaft, as discussed below. Extending from an opposing end of each pocket 130, which is proximal to the dead end circumferential groove 115, is an outlet 140 wherein the outlet 140 places each pocket 130 into fluid communication with the dead end circumferential groove 115.

As with the first embodiment, the second embodiment may also include a bleed hole 120. The bleed hole 120 may be at one end of the dead end circumferential groove 115 may place the dead end circumferential groove 115 into fluid communication with the socket 70. These holes and/or slots are in accordance with the above and are the same as shown in FIG. 6 and in FIG. 7.

Figure 10A:
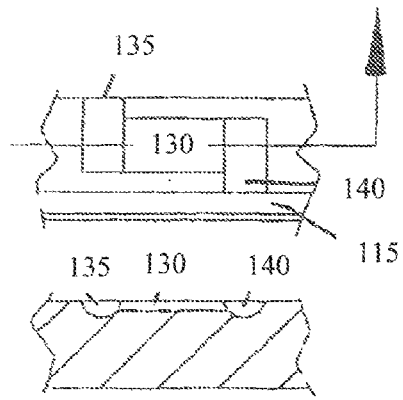
FIG. 10A-10E illustrates various forms of pockets useful in a shallow pocket seal of the type illustrated in FIG. 9. Specifically.
Figure 10B:
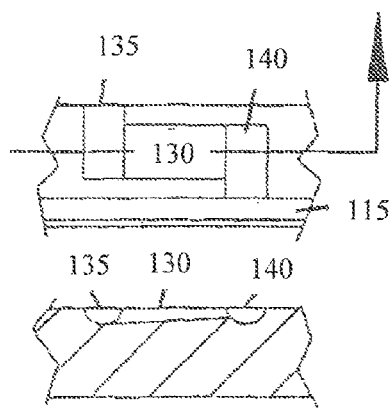
Figure 10C:
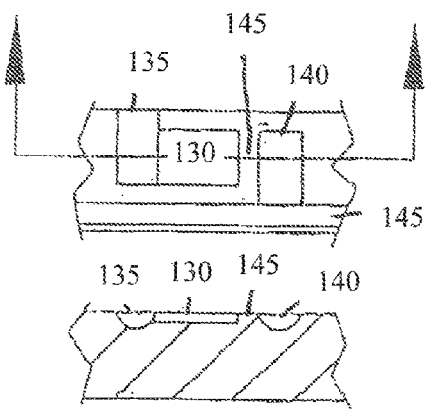
Figure 10D:
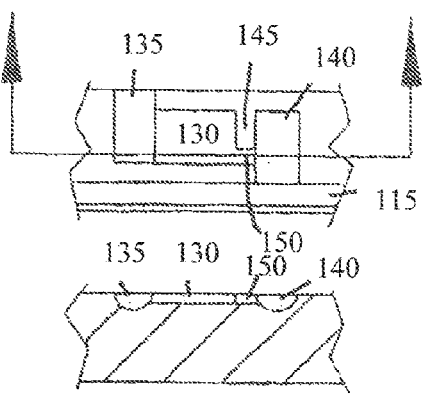

The dimensions of the hydrodynamic shallow pockets 129 are not limited to one embodiment. FIG. 10 shows various forms of shallow pockets, all in accordance with the present invention. Specifically, the number of pockets, the depth, the width, and the length can be machined, as needed, based upon the particular application of the seal assembly. The width and depth of the pockets 130, outlets 140 and inlets 135 are dependent upon multiple factors including, but not limited to, the engine applications shaft rotational speeds, desired seal life and the like. In one embodiment, the hydrodynamic shallow pocket may be within the range of 0.0005 to 0.035 inches in depth and 0.040 to 0.093 inches in width. In a further embodiment, it is desirable that the hydrodynamic shallow pockets be within a range of 0.020 to 0.025 inches in depth and 0.076 to 0.093 inches in width. The inlet 135 and outlet 140 may be a constant depth and/or width and the pocket 130 may be the same or slightly larger width and/or depth. In another embodiment, as illustrated in FIG. 10B the shallow pocket 130 may be tapered, with a greater depth and/or width proximal to the inlet 135 and a smaller depth and/or width proximal to the outlet 140, thereby increasing the air pressure as the air flow approaches the dead end groove 115. In a further embodiment, as illustrated in FIG. 10C the shallow pocket 130 may be of an even or tapered depth with a dam 145 between the pocket 130 and the outlet 140. This arrangement generates very high pressure within the pocket 130. Specifically, the generated pressure builds up and is forced over the dam 145 into the outlet 140. This, in turn, supplies high pressure into the dead end circumferential groove 115. In another embodiment, referring to FIG. 10D, a bleed slot 150 may be added through the dam 145 to release the generated high pressure directly into the outlet 140.

Depending on the application, each seal segment 60 may even have shallow pockets 130 with various depths (multi-depth pockets), instead of all pockets being the same depth. The advantage of having segments with multi-depth pockets is that in the event the very shallow pocket wears down or even off due to rubbing wear, the other pockets will pump the gas and generate high pressures until they wear down or even wear off, one at a time. To this end, these multi-depth pockets may be in accordance with the above and in accordance with FIGS. 5D and 8E.

Figure 10E:
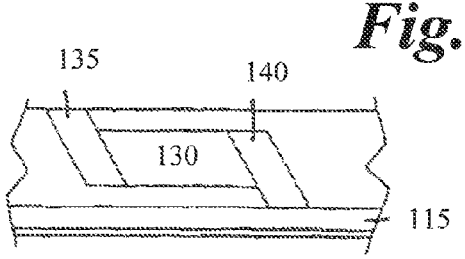

Depending on the application, the inlet 135 and the outlet 140 may be angled, as shown in FIG. 10E, preferably, such that the angle of the inlet 135 and outlet 140 is in concert with the direction of shaft rotation. The inlets 135 and outlets 140 of the shallow pocket 129 may, therefore, employ either a right hand pitch angle (not illustrated) or a left hand pitch angle (FIG. 10E) depending upon the direction of rotation of the shaft. For a shaft rotating clockwise, a pitch angle of the thread would be a right hand angle (not illustrated), thus pushing the air toward the dead end groove 115. Conversely, for counterclockwise rotation of the shaft, the pitch angle of the thread would be a left hand thread (FIG. 10E) to achieve the same result.

In each of the above embodiments, the varying measurements may be further tailored based on factors such as the speed of rotation of the shaft 40, pressure differential between the sump and the gas side of the seal, temperature, size of the rotatable shaft, or similar parameters to optimize the efficiency of air movement and the pressure created with in the dead end circumferential groove. In one embodiment, the dimensions of the dead end groove 115 and the shallow pockets 130 are preferably such that the pressure generated within the dead end groove 115 is higher than the pressure on the gas side 22 of the seal. To this end, the measurements of each of the above elements may be scaled up or down based upon the size of the fluid seal assembly and the aforementioned factors in tailoring the measurements thereof.

The seal ring segments are coupled, as discussed above, about the circumference of a rotatable shaft by way of the tongue and sockets and are biased against the shaft surface when the shaft is non-operational. When the shaft rotates, the hydrodynamic shallow pockets 129 direct air generated by the rotation of the shaft 40 along the inlet 135 through the pocket 130 and the outlet 140 to, ultimately, the dead end circumferential groove 115. As air passes along the hydrodynamic shallow pocket 129, it begins to accumulate within the dead end circumferential groove 115, thus generating high pressure therein. In one embodiment, the high pressure generated within the dead end groove 115 may be higher than the pressure exerted on the seal segments 60 from a gas side 22 of the seal. In either case, the pressure within the dead end groove 115 is redirected toward the shaft creating a lift force on the seal segments wherein the lift force expands the sealing segments away from the shaft creating a minute clearance between the shaft-face of the seal segments and the rotating shaft. The redirection of the pressurized air within the dead end groove toward the shaft also creates an air/pressure seal within this minute clearance wherein the force of the high-pressure gas is at a sufficient velocity to prevent lubricant stored within the chamber from passing through the clearance. This air pressure seal is juxtaposed to the bore dam of the shaft-face of the seal such that the bore dam acts in concert with the air/seal to prevent lubricant from escaping from the housing chamber during operation of the turbine engine. In other words, lubricant is prevented from escaping from the lubricant side to the gas side of the chamber. This configuration has the advantages of creating an air seal that does not interfere with the rotation of the shaft, while reducing the wear on the shaft-side face seal as a result of the rotation of the shaft.

The second embodiment of the present invention containing the hydrodynamic shallow pockets has the same advantages as the first embodiment. Specifically, the hydrodynamic shallow pockets are advantageous because they greatly reduce leakage of liquids into the region on the gas side of the seal, regardless of the pressure differential across the face of the seal. In other words, the seal is able to function during both high and low air side to oil side pressure differential, as well as when negative pressure exists on the air side. Furthermore, the hydrodynamic shallow pockets generate less heat due to friction because there is minimal rubbing between the seal bore and the runner or the shaft. This provides extended seal wear life compared to a standard circumferential seal contacting the runner. Finally, the hydrodynamic shallow pockets is advantageous because it provides for reduced bore loading, thus, allowing for a more robust seal face.

Figure 11:
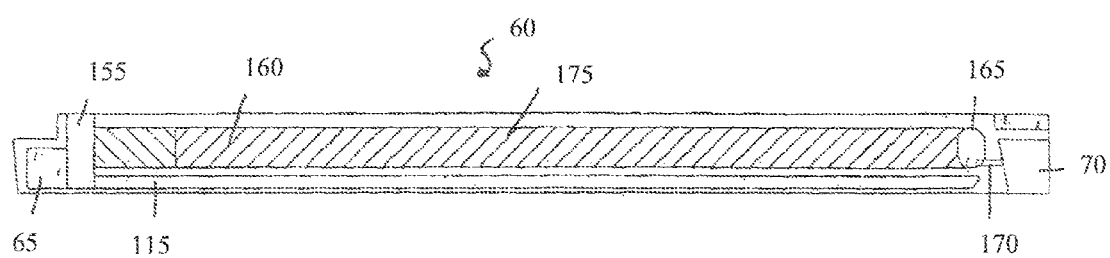
FIG. 11 is a view, looking radially outwardly, of the radially inwardly facing surface of a circumferential seal segment having a single annular hydrodynamic groove connected to a socket bleed hole, all in accordance with the invention.

In a third embodiment of the present invention, referring to FIG. 11, the additional grooves along the shaft-side face of the seal 60 is at least one axial bore groove 155, which extends perpendicularly to the longitudinal axis of the seal segment, and a dead end circumferential groove 115. The axial bore groove 155 is desirably on one end of the seal segment 60 that is proximal to the segment's tongue 65. However, the present invention is not limited to this embodiment. The axial bore groove 155 may be substantially square or rounded with a depth within the range of 0.0005 to 0.035 inches wherein the depth is desirably between 0.20 to 0.025 inches in depth. The depth of the axial bore groove 155 may be dependent upon multiple factors including, but not limited to, the engine application, shaft rotational speeds, desired seal life and the like. The axial bore may also be aerodynamically or hydrodynamically tapered such that air flow generated by the rotation of the shaft is received by the axial bore groove 155. Extending from, and in fluid communication with the axial bore groove 155, is the dead end circumferential groove 115. The dead end circumferential groove 155 may be squared or rounded with a depth of 0.035 to 0.045 inches. To this end, the transition between the axial bore groove 155 and the dead end circumferential groove 115 may be a step-off from the depth of the bore groove 155 to the deeper circumferential groove 115 or a taper wherein the transition from the depth of the axial bore groove 155 to the circumferential groove 115 is gradual. However, the present invention is not limited to these embodiments. Rather, in another embodiment, the depths of the axial bore groove 155 and the circumferential groove 115 are the same, within or between either of the depth ranges above. Optionally, a dam may also be provided between the axial bore groove 155 and the dead end circumferential groove 115 wherein the dam may also contain an optional bleed hole in accordance with the dam structure above.

Also extending perpendicularly from the axial bore groove 155, and along the longitudinal axis of the seal segment 60, is at least one longitudinal bore groove 175. The longitudinal bore groove 175 may be semi-cylindrical in shape and extend along substantially the entire length of the seal segment 60 toward the socket 70. Along a perimeter wall, of the longitudinal bore groove 175 is at least one hydrodynamic groove 160. The pitch angle of the hydrodynamic groove is at an oblique angle with respect to the longitudinal axis of the seal ring segment 60 and is angled such that the hydrodynamic groove urges air flow received by the axial bore groove 155 along the longitudinal axis of the seal segment 60. In one embodiment, the hydrodynamic groove may be of a depth range of 0.0005 to 0.035 inches wherein the depth is desirably between 0.20 to 0.025 inches. To this end, the circumference of the longitudinal bore groove 175 may be at least 0.0010 to 0.070 wherein the circumference is desirably between 0.004-0.040 inches.

Proximal to the socket 70 end of the seal segment 60 is a pressure chamber 165. The pressure chamber 165 may be of a depth of 0.040-0.050 inches and may be in fluid communication with the longitudinal bore groove 175. In one embodiment, a radial bleed hole 170 may extend from the pressure chamber 165 to the socket 70 such that the socket is in fluid communication with the pressure chamber 165.

In each of the above embodiments, the varying measurements may be further tailored based on factors such as the speed of rotation of the shaft, pressure differential between the sump and the gas side of the seal, temperature, size of the rotatable shaft, or similar parameters to optimize the efficiency of air movement and the pressure created with in the dead end circumferential groove. To this end, the measurements of each of the above elements may be scaled up or down based upon the size of the fluid seal assembly and the aforementioned factors in tailoring the measurements thereof. Accordingly, the ranges provided for each of the elements above are intended to limit the size of the present invention and the present invention may be scaled up or down in accordance with parameters above.

In operation, as the shaft 40 rotates, air flow is generated around the shaft. The axial bore groove 155 directs the air flow to both the dead end circumferential groove 155 and the longitudinal bore groove 175. Within the longitudinal bore groove 175, air is directed by the hydrodynamic groove 160 along the longitudinal bore groove's longitudinal axis toward and into the pressure chamber 165. The hydrodynamic groove 160, therefore, functions to generate gas pressure, increasing along the longitudinal axis of the longitudinal bore groove 175, due to the viscosity of the gas and shear forces on the molecules. To this end, pressurized gas is contained in the pressure chamber 165, which is vented into the socket 70 through the radial bleed hole 170. By providing a radial bleed hole 170 connected to the pressure chamber 165 and, ultimately, the hydrodynamic groove 160, gas pressure continues to blow into the joints even at low or reverse pressure conditions. Thus, forcing pressurized air into the sockets acts as a seal within the socket/tongue joints of two adjacent seal segments and prevents liquid weepage therethrough.

Additionally, because the axial bore groove 155 intersects directly with the dead end circumferential groove 115, the dead end circumferential groove accumulates air resulting in an increase in pressure therein. If a bore dam is present between the axial bore groove and the dead end circumferential groove, air pressure builds up at the axial bore groove/dam interface such that highly pressurized air is forced over the dam, or through an optional bleed hole, and into the dead end circumferential groove 115. In either case, the pressure within the dead end groove 115 is redirected toward the shaft creating a lift force on the seal segments wherein the lift force expands the sealing segments away from the shaft creating a minute clearance between the shaft-face of the seal segments and the rotating shaft. The redirection of the pressurized air within the dead end groove toward the shaft also creates an air/pressure seal within this minute clearance wherein the force of the high-pressure gas is at a sufficient velocity to prevent lubricant stored within the chamber from passing through the clearance. This air pressure seal is juxtaposed to the bore dam of the shaft-face of the seal such that the bore dam acts in concert with the air/seal to prevent lubricant from escaping from the housing chamber during operation of the turbine engine. In other words, lubricant is prevented from escaping from the lubricant side to the gas side of the chamber. This configuration has the advantages of creating an air seal that does not interfere with the rotation of the shaft, while reducing the wear on the shaft-side face seal as a result of the rotation of the shaft.

The third embodiment of the present invention containing the longitudinal bore grooves has the same advantages as the first embodiment. Specifically, the longitudinal bore grooves are advantageous because they greatly reduce leakage of liquids into the region on the gas side of the seal, regardless of the pressure differential across the face of the seal. In other words, the seal is able to function during both high and low air side to oil side pressure differential, as well as when negative pressure exists on the air side. Furthermore, the longitudinal bore grooves generate less heat due to friction because there is minimal rubbing between the seal bore and the runner or the shaft. This provides extended seal wear life compared to a standard circumferential seal contacting the runner. Finally, the longitudinal bore grooves is advantageous because it provides for reduced bore loading, thus, allowing for a more robust seal face.

Figure 12:
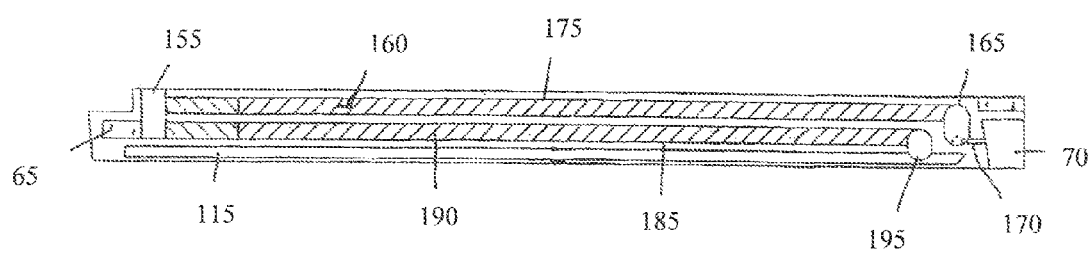
FIG. 12 is a view similar to FIG. 11 where the circumferential seal segment has two annular hydrodynamic grooves, one annular hydrodynamic groove being connected to a socket bleed hole and a second annular hydrodynamic groove being connected to the circumferential bore groove.

Referring to FIG. 12, an alternative to the third embodiment of the present invention is illustrated. FIG. 12 illustrates an aspect of the invention in which the axial bore groove 155 does not intersect the dead end circumferential groove 115. More specifically, in this embodiment there are two longitudinal bore grooves each with a respective hydrodynamic groove and pressure chamber. The first longitudinal bore groove 175, just as the above embodiment, extends from the axial bore groove 155 and contains a hydrodynamic groove 160 therein which directs air into a pressure chamber 165. The pressurized air of the pressure chamber 165 is vented into the socket 70 by the radial bleed hole 170.

The second longitudinal bore groove 185 also extends from the axial bore groove 155 along the longitudinal axis of the seal segment. The second longitudinal bore groove 185 is semi-cylindrical in shape and extends along substantially the entire length of the seal segment 60 toward the socket 70 end of the seal segment. Along a perimeter wall, of the second longitudinal bore groove 185 is at least one hydrodynamic groove 190. The pitch angle of the hydrodynamic groove 190 is at an oblique angle with respect to the longitudinal axis of the seal segment 60 and is angled such that the hydrodynamic groove 190 directs air from the axial bore groove 155 along the longitudinal axis of the seal segment 60. In one embodiment, the shallow hydrodynamic groove may be of a depth range of 0.002-0.020 inches. To this end, the circumference of the second longitudinal bore groove 185 is at least 0.004-0.040 inches.

At the socket 70 end of the seal segment 60 is a second pressure chamber 195. The pressure chamber 195 may be of a depth of 0.040-0.050 inches and is in fluid communication with both the second longitudinal bore groove 185 and the dead end circumferential groove 115. In one embodiment, the second pressure chamber 195 is separated from the dead end circumferential groove 115 by a bore dam (not illustrated), thus generating very high pressure. Specifically, air pressure builds up at the pressure chamber/dam interface such that highly pressurized air is forced over the dam and into the dead end circumferential groove 115.

In operation, as a shaft rotates, air is generated around the shaft which enters both of the longitudinal bore grooves 175 and 185 by way of the deep axial bore groove 155. Within the first longitudinal bore groove 175, air is directed toward the pressure chamber 165 and ultimately to the socket 70 by way of the radial bleed hole 170, as described above. Within the second longitudinal bore groove 185, air is directed by the hydrodynamic groove 190 along the longitudinal bore groove's longitudinal axis toward and into the second pressure chamber 195. The hydrodynamic groove 190 of the second longitudinal bore groove 1853 therefore, functions to generate gas pressure, which increases along the longitudinal axis of the longitudinal bore groove 185 due to the viscosity of the gas and shear forces on the molecules. To this end, pressurized gas is contained in the second pressure chamber 195, which may then be vented into the dead end circumferential groove 115 and maintain the seal between the shaft and seal segments in accordance with the foregoing.

Figure 13:
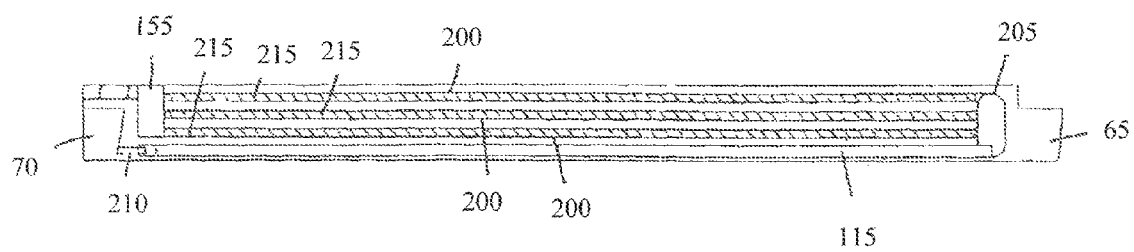
FIG. 13 is a view similar to FIGS. 11 and 12 where the circumferential seal segment has three annular hydrodynamic grooves connected to the circumferential bore groove and has an optional socket bleed hole.

Referring to FIG. 13, another alternative to the third embodiment of the present invention is illustrated. Specifically, the axial bore 155 is located at the socket 70 end of the seal segment and dimension in accordance with the description above. One or more longitudinal bore grooves 200 extend from the axial bore 155 both along the longitudinal axis of and toward the tongue 65 end of the seal segment. The longitudinal bore grooves 200 may be dimensioned in accordance with the above and each contain at least one hydrodynamic groove 215 also in accordance with the dimensions discussed above wherein the pitch angles of each hydrodynamic groove 215 may be the same or at varying angles. Each of the longitudinal bore grooves 200 is in fluid communication with a single pressure chamber 205, as dimensioned above, wherein the pressure chamber 205 is at the tongue 65 end of the seal segment. The pressure chamber 205 is in fluid communication with the dead end circumferential groove 115 at an end of the groove proximal to the tongue 65 of the seal segment.

At the end of the dead end groove proximal to the socket 70, is a radial bleed hole 210. The radial bleed hole is in fluid communication with the dead end circumferential groove 115 and the socket 70 such that pressured air within the dead end circumferential groove 115 may escape into the socket 70.

In operation, as a shaft rotates, air flow is generated around the shaft. The axial bore groove 155 directs air flow to each of the longitudinal bore grooves 200. Within each the longitudinal bore groove 200, air is directed by the hydrodynamic grooves 215 of each bore 200 along the longitudinal axis of the seal segment and toward and into the pressure chamber 205. The shallow hydrodynamic grooves 215, therefore, function to generate gas pressure, increasing along the longitudinal axis of each longitudinal bore groove 200, due to the viscosity of the gas and shear forces on the molecules. To this end, pressurized gas is contained in the pressure chamber 205, which may then be vented into the dead end circumferential groove 115 and maintain the seal between the shaft and seal segments in accordance with the foregoing.

The pressurized air within the dead end circumferential groove 115 may also be vented into the socket 70 through the radial bleed hole 210. By providing a radial bleed hole 210 connected to the dead end circumferential groove 115, gas pressure continues to blow into the socket/tongue joints even at low or reverse pressure conditions. Thus, forcing pressurized air into the sockets acts as a seal within the socket/tongue joints of two adjacent seal segments and prevents liquid weepage therethrough.

Figure 14:
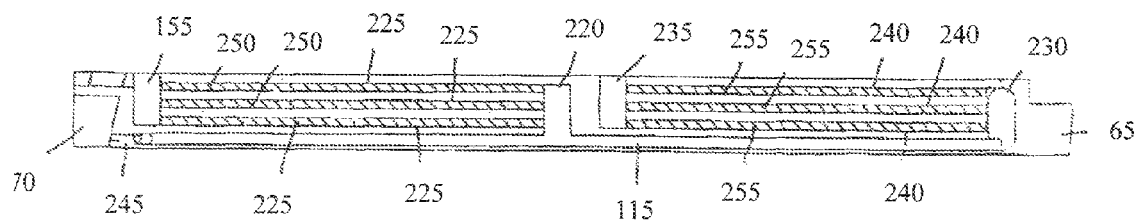
FIG. 14 is a view similar to FIGS. 11, 12 and 13 of a circumferential seal segment where the segment shown in FIG. 14 has two sets of three annular hydrodynamic grooves connected to the circumferential bore groove with an optional socket bleed hole.

In an even further alternative third embodiment of the present invention, there may be more than one axial grooves on each seal segment, as illustrated in FIG. 14. Specifically, one or more axial bore grooves 155 may be position along the length of the seal segment. In a non-limiting, example, as illustrated in FIG. 14, the seal segments may be comprised of at least two axiabores. The first axial bore groove 155 may be located at the socket 70 end of the seal segment and dimension in accordance with the description above. One or more longitudinal bore grooves 225 extend from the axial bore groove 155 both along the longitudinal axis of and toward the tongue 65 end of the seal segment. The longitudinal bore grooves 225 may be dimensioned in accordance with the above and each contain at least one hydrodynamic groove 250 also in accordance with the dimensions discussed above wherein the pitch angles of each hydrodynamic groove 250 may be the same or at varying angles. Each of the longitudinal bore grooves 225 is in fluid communication with a pressure chamber 220, as dimensioned above, wherein the pressure chamber 220, in a non-limiting embodiment, may be substantially centered on the seal segment. The pressure chamber 220 is in fluid communication with the dead end circumferential groove 115. Adjacent to the pressure chamber 220 is a second axial bore groove 235. The second axial bore groove 235, in a non-limiting embodiment, may be located substantially centered on the seal segment and dimension in accordance with the above. One or more longitudinal bore grooves 240 extend from the second axial bore groove 235 both along the longitudinal axis of and toward the tongue 65 end of the seal segment. The longitudinal bore grooves 235 may be dimensioned in accordance with the above and each contain at least one hydrodynamic groove 255 also in accordance with the dimensions discussed above wherein the pitch angles of each hydrodynamic groove 255 may be the same or at varying angles. Each of the longitudinal bore grooves 240 is in fluid communication with a second pressure chamber 230, as dimensioned above, wherein the second pressure chamber 230 is at the tongue 65 end of the seal segment. The second pressure chamber 230 is in fluid communication with the dead end circumferential groove 115. To this end, both the first and second pressure chambers 220, 230 are both in communication with the dead end circumferential groove 115.

At an end of the dead end groove proximal to the socket 70, is a radial bleed hole 245. The radial bleed hole is in fluid communication with the dead end circumferential groove 115 and the socket 70 such that pressured air within the dead end circumferential groove 115 may escape into the socket 70.

In operation, as a shaft rotates, air is generated around the shaft which enters each of the longitudinal bore grooves 225, 240 by way of the each bore's respective deep axial bore groove 155, 235. Within each the longitudinal bore groove 225, 240, air is directed by the hydrodynamic grooves 250, 255 along the longitudinal axis of the seal segment toward and into each respective pressure chamber 220, 230. The hydrodynamic grooves, therefore, function to generate gas pressure, increasing along the longitudinal axis of each longitudinal bore groove 225, 240, due to the viscosity of the gas and shear forces on the molecules. To this end, pressurized gas is contained in both pressure chambers 220, 230. Because both pressure chambers 220, 230 are in fluid communication with the dead end circumferential groove 115, the pressurized gas may then be vented into the dead end circumferential groove 115 and maintain the seal between the shaft and seal segments in accordance with the foregoing.

The pressurized air within the dead end circumferential groove 115 may also be vented into the socket 70 through the radial bleed hole 245. By providing a radial bleed hole 245 connected to the dead end circumferential groove 115, gas pressure continues to blow into the socket/tongue joints even at low or reverse pressure conditions. Thus, forcing pressurized air into the sockets acts as a seal within the socket/tongue joints of two adjacent seal segments and prevents liquid weepage therethrough. Because pressure is generated regardless of the speed of the rotating shaft, pressure continues to blow into the joints and between the seal segments and the shaft even at low or reverse pressure conditions.

What is claimed is:

1. A seal assembly for sealing a liquid region from a gas region across an annular surface of a rotating shaft comprising:
   a plurality of adjoining annularly sealing ring segments facing the rotating shaft wherein each sealing ring segment includes a dead end circumferential groove machined within a shaft-side face of each sealing ring segment such that, when the segments are joined about the shaft surface, the circumferential dead end groove of each segment extends arcuately in the direction of shaft rotation;

at least one additional groove extending across the shaft-side face of each sealing ring segment leading to the dead end circumferential groove wherein the additional groove(s) is in fluid communication with the dead end circumferential groove and directs fluid into the dead end circumferential groove; and a bleed hole or a bleed slot directly extending from the dead end circumferential groove to a joint between adjoining sealing ring segments such that the dead end circumferential groove is in fluid communication with the joint and fluid flow is directed into the joint by way of the bleed hole or the bleed slot.

2. A method of sealing a liquid region from a gas region across an annular surface of a rotating shaft utilizing a plurality of adjoining annularly sealing ring segments facing the rotating shaft, each sealing ring segment having a dead end circumferential groove formed within a shaft-side face of each sealing ring segment at a position closer to the liquid region than to the gas region such that, when the segments are positioned proximate the shaft surface, the circumferential dead end groove of each segment extends arcuately in the direction of shaft rotation, and at least one additional groove formed on the shaft-side face of each sealing ring segment wherein the additional groove(s) is in fluid communication with the dead end circumferential groove, a bleed slot or a bleed hole directly extending from the dead end circumferential groove to a joint between adjoining sealing ring segments, comprising;

directing fluid flow generated by the rotating shaft along the additional groove(s) and into the dead end circumferential groove such that the fluid is pressured as it flows along the additional groove(s) and into the dead end circumferential groove;

creating an air seal around the rotating shaft as the pressurized air within the dead end circumferential groove is urged toward the rotating shaft; and redirecting pressurized air from the dead end circumferential groove to the joint between adjoining sealing ring segments through the bleed slot or the bleed hole such that the force of the pressured air is also exerted on the joint between adjoining sealing ring segments, thereby created an air seal within the joint and between the adjoining sealing ring segments.

3. A method of sealing a liquid region from a gas region across an annular surface of a rotating shaft utilizing a plurality of adjoining annularly sealing ring segments facing the rotating shaft, each sealing ring segment having a dead end circumferential groove formed within a shaft-side face of each sealing ring segment at a position closer to the liquid region than to the gas region such that, when the segments are positioned proximate the shaft surface, the circumferential dead end groove of each segment extends arcuately in the direction of shaft rotation, and at least one additional groove, selected from the group consisting of a hydrodynamic inclined groove, a hydrodynamic shallow pocket, and an axial bore groove, formed on the shaft-side face of each sealing ring segment wherein the additional groove(s) is in fluid communication with the dead end circumferential groove, a bleed slot or a bleed hole directly extending from the dead end circumferential groove to a joint between adjoining the sealing ring segments, comprising;

urging the sealing ring segments toward the shaft such that the sealing ring segments from a seal with the shaft when the shaft is not rotating;

rotating the shaft;

directing fluid flow generated by the rotating shaft along the additional groove(s) and into the dead end circumferential groove such that the fluid is pressured as it flows along the additional groove(s) and into the dead end circumferential groove;

redirecting the pressurized fluid within the dead end circumferential groove toward the rotating shaft so as to provide a lift force on the seal segments that lifts the seal segments away from the rotating shaft;

creating an air seal around the rotating shaft as the pressurized air within the dead end circumferential groove is urged toward the rotating shaft, thereby, maintaining a seal between the shaft and the sealing ring segments during rotation and non-rotation of the shaft; and redirecting pressurized air from the dead end circumferential groove to the joint between adjoining sealing ring segments through the bleed slot or the bleed hole such that the force of the pressured air is also exerted on the joint between adjoining sealing ring segments, thereby created an air seal within the joint and between the adjoining sealing ring segments.

* * * * *